(12) United States Patent  
Burks et al.

(10) Patent No.: US 7,257,278 B2  
(45) Date of Patent: Aug. 14, 2007

(54) IMAGE SENSOR FOR CAPTURING AND FILTERING IMAGE DATA

(75) Inventors: David Burks, Loveland, CO (US); Andrew C. Goris, Loveland, CO (US); Kevin W. Nay, Fort Collins, CO (US); Casey Miller, Fort Collins, CO (US); James W. Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 641 days.

(21) Appl. No.: 10/374,276

(22) Filed: Feb. 26, 2003

(65) Prior Publication Data

US 2004/0165080 A1 Aug. 26, 2004

(51) Int. Cl.
*G06K 9/20* (2006.01)
*G06K 9/36* (2006.01)

(52) U.S. Cl. .................................................. 382/312

(58) Field of Classification Search ................ 382/254, 382/260, 276, 277, 299, 312, 313; 348/207.99, 348/220.1, 222.1, 223.1, 234, 243, 302, 312, 348/229.1; 345/156, 179; 396/282; 235/380; 399/47
See application file for complete search history.

(56) References Cited

U.S. PATENT DOCUMENTS

| | | | |
|---|---|---|---|
| 4,809,351 A * | 2/1989 | Abramovitz et al. | 382/313 |
| 4,831,410 A * | 5/1989 | Adams et al. | 399/47 |
| 5,982,424 A * | 11/1999 | Simerly et al. | 348/229.1 |
| 6,061,092 A | 5/2000 | Bakhle et al. | |
| 6,151,069 A | 11/2000 | Dunton et al. | |
| 6,374,054 B1 | 4/2002 | Schinner | |
| 6,411,331 B1 | 6/2002 | Sansom-Wai et al. | |
| 6,417,882 B1 | 7/2002 | Mahant-Shetti et al. | |
| 6,710,801 B1 | 3/2004 | Kubo | |
| 6,766,945 B2 * | 7/2004 | Kia et al. | 235/380 |
| 6,825,876 B1 * | 11/2004 | Easwar et al. | 348/234 |
| 2003/0095098 A1 * | 5/2003 | Paul et al. | 345/156 |
| 2004/0017477 A1 * | 1/2004 | Cooper et al. | 348/207.99 |
| 2004/0106211 A1 * | 6/2004 | Kauer et al. | 436/169 |
| 2004/0165080 A1 * | 8/2004 | Burks et al. | 348/222.1 |
| 2005/0162531 A1 * | 7/2005 | Hsu et al. | 348/222.1 |
| 2005/0225541 A1 * | 10/2005 | Lapstun et al. | 345/179 |

FOREIGN PATENT DOCUMENTS

| | | |
|---|---|---|
| EP | 0989741 A | 3/2000 |
| JP | 02-187871 | 7/1990 |
| JP | 2000-023040 | 1/2000 |
| JP | 2000278591 | 10/2000 |
| JP | 2002-083292 | 3/2002 |

OTHER PUBLICATIONS

Netherlands Search Report dated Nov. 4, 2005.

* cited by examiner

*Primary Examiner*—Amir Alavi

(57) ABSTRACT

An integrated image sensor for acquiring and processing electrical signals representative of an object comprising a photosite array configured to convert light into the electrical signals, an A/D converter configured to convert the electrical signals into digital data, and logic integral with the image sensor configured to scale the digital data by a non-integer-scaling factor. A method for acquiring and processing image data with an integrated image sensor comprising the steps of capturing, via the image sensor, the image data representative of an image, scaling, via the image sensor, the image data by a non-integer value, and outputting from the integrated image sensor scaled image data.

20 Claims, 7 Drawing Sheets

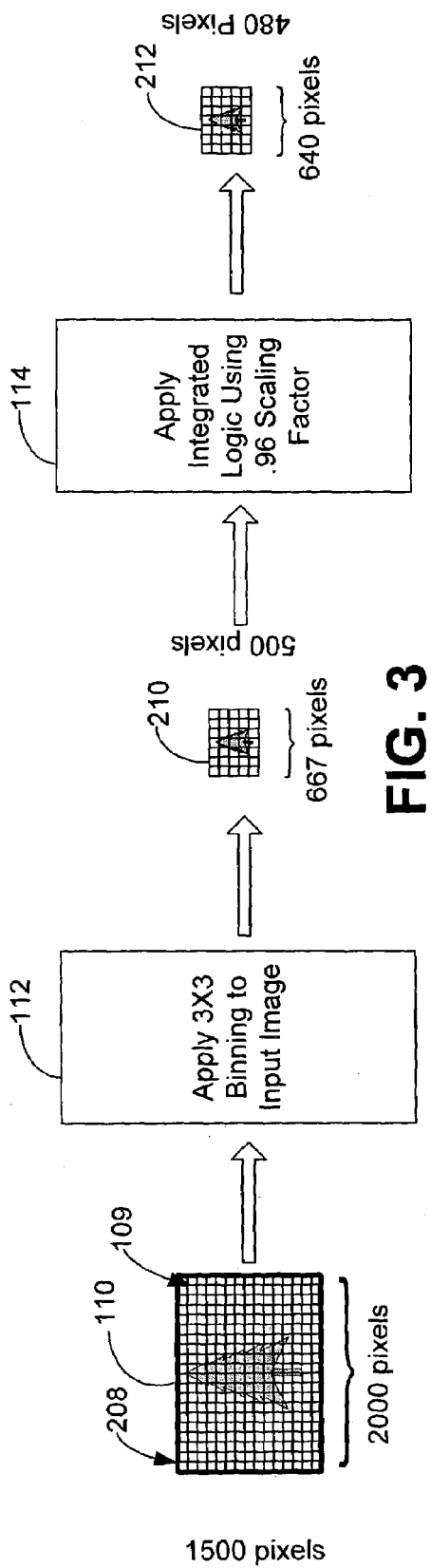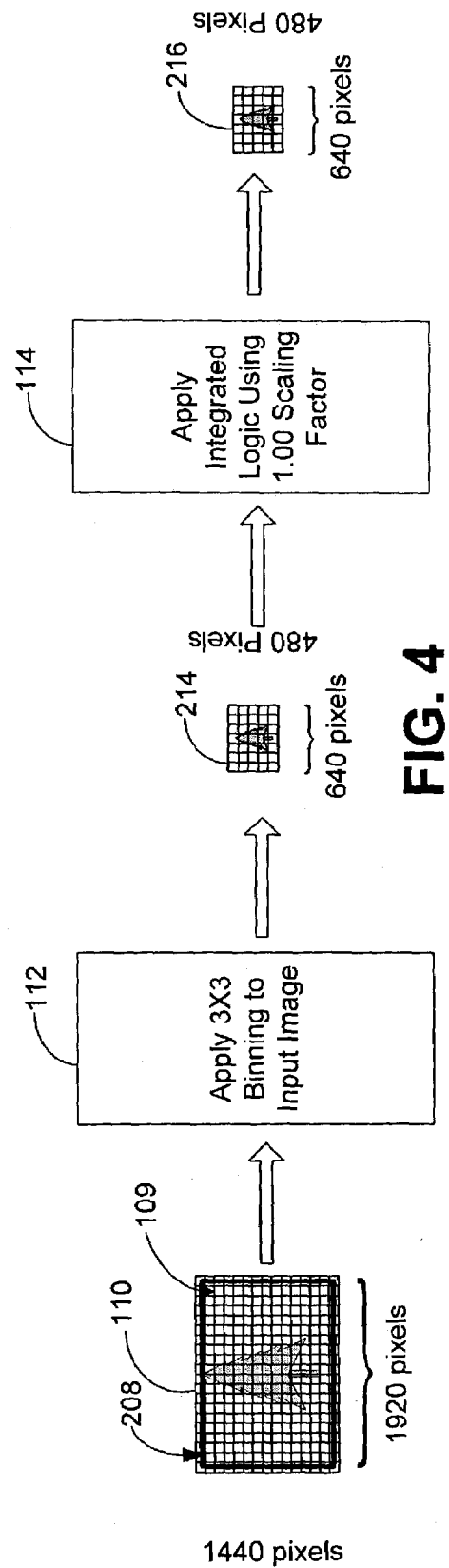

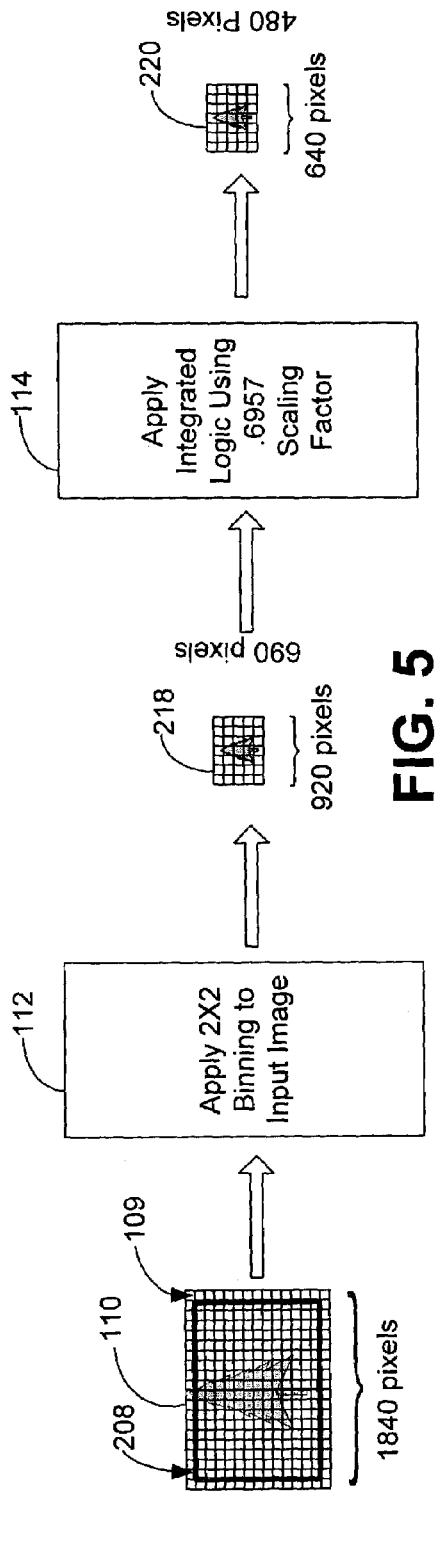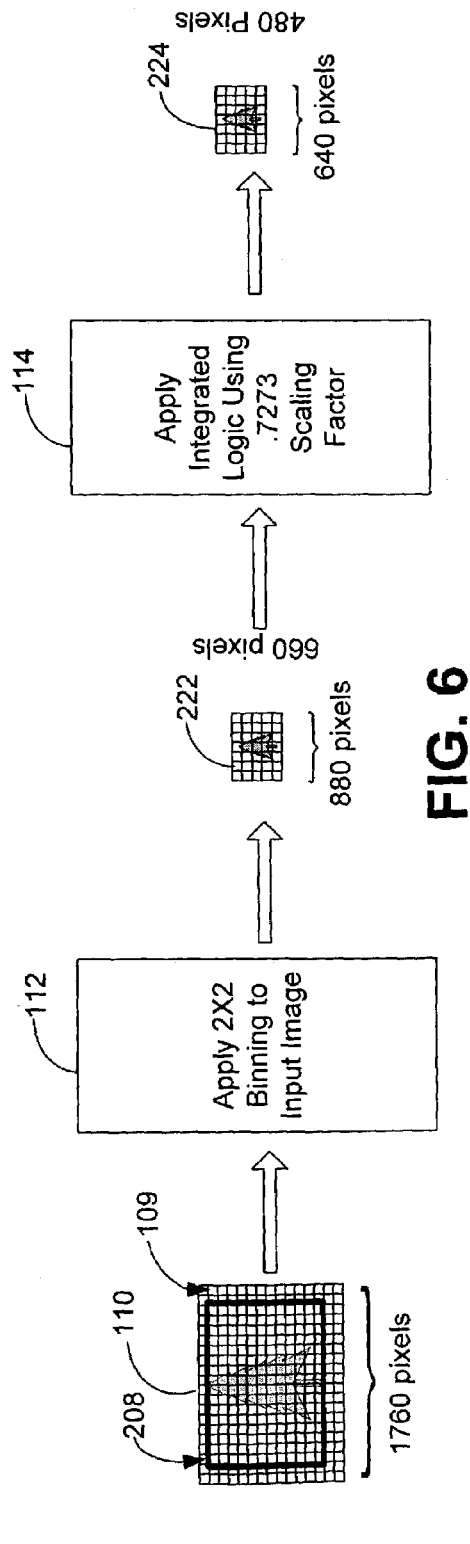

IMAGE SENSOR FOR CAPTURING AND FILTERING IMAGE DATA

BACKGROUND OF THE INVENTION

1. Field of the Invention

The present invention generally relates to image acquisition and processing, and, in particular, to a system and method that integrates spatial image resolution scaling, commonly called image resizing, on an image sensor.

2. Related Art

A digital camera typically employs image sensors to convert light reflected by an object through an optical lens into electrical signals. Sensor technology utilized in digital cameras may employ a charge coupled device (CCD) or a complementary metal oxide semiconductor (CMOS) image sensor to convert the light (photons) into electrical signals (electrons).

The sensor technology in a digital camera typically includes an array of photodiodes, referred to in the art as "photosites." The array of photosites is conceptually a two-dimensional array, and each photosite in the array converts a small portion of the total light detected, which is reflected from an object within the lens' field of view, into electrical signals.

Typically, the electrical signals are analog signals, which are converted into digital format by an analog-to-digital (A/D) converter. The A/D converter may either be located on the sensor (e.g., on a portion of the semiconductor chip, which comprises a CMOS image sensor) or the A/D converter may receive the output of the sensor. In either embodiment, the A/D converter typically converts the analog signal to a digital signal, and then transmits the digital signal to a general-purpose processor or application specific integrated circuit (ASIC) within the digital camera.

The processor of the digital camera performs a wide variety of image processing functions. These operations commonly include auto-exposure, auto-focus, automatic white balancing, sharpening, image spatial resolution scaling, compression as well as other proprietary image processing operations known in the art. After the digital image data is fully processed, it is usually stored in digital format in memory located within the digital camera.

Recent technological advances have resulted in sensors for digital cameras, which can produce outputs in the several megapixels. For example, a typical CMOS image sensor or CCD sensor can employ a 2000×1500 array of photosites, which output three million analog signals. If three million analog signals representative of light detected by the photosites are digitized, then a typical representation of one single still image or frame would comprise approximately three million image data values. Moreover, if the digital camera were in video mode to capture motion, then a full photosite array collection may be three million pixels at up to thirty frames per second. Common frame rates for full motion digital video range between 24 and 30 frames per second.

Even if the sensors are equipped to collect megapixels of data at video frame rates, typically, the bus bandwidth and data processing capabilities of digital cameras are unable to manipulate such a large volume of data. In other words, the computation requirements necessitated by such a large volume of data (e.g., three million pixels per frame at a rate of 30 Hz) would easily exceed the processing capabilities of the system.

To reduce the volume of image data generated by the image sensor and, therefore, consumed by the camera's processor, sensors may include logic that performs a process known in the art as "pixel binning." Generally, pixel binning refers to collecting multiple pixel signals in the vertical and/or horizontal direction, into a single larger charge, which represents the area of the individual pixels contributing to the charge. In this regard, as light falls on an image sensor, for example a CCD, electrons accumulate at each pixel. Note that the number of electrons that a pixel is capable of accumulating varies, depending upon the type of image sensor employed. However, for exemplary purposes, assume that each pixel of the image sensor is capable of accumulating 100,000 electrons at each pixel, which is commonly referred to in the art as "well depth." A group of the pixels are then "binned" by summing the accumulated electrons at each pixel in the group into a single charge, or "superpixel."

For example, a binning of 3×3 means that an area of nine (9) adjacent pixels have been combined into one large pixel. Employing the example provided hereinabove, if each pixel is capable of accumulating 100,000 electrons, and each pixel in the nine adjacent pixels accumulate 80,000 electrons, then the superpixel that results from binning the nine pixels with a 3×3 matrix is a single "superpixel" comprised of 720,000 electrons.

Moreover, the 3×3 binning applied to a sensor that has a photosite array of 2000×1500, results in data collected that comprises a two-dimensional array of 667×500. Therefore, the amount of collected data for each frame is reduced in size from three megapixels to approximately three-hundred thousand (300,000) pixels. This reduction in the sensor's output data rate is intended to bring the sensor's output data rate into the processing capability of the camera's processor.

Note that the "superpixel" method of binning electrons from an image sensor is an example of a binning method known in the art. Other binning methods known in the art may also be implemented to reduce the volume of image data produced by the image sensor.

Typically, after electrical signals are binned, the data is transmitted from the sensor to a general-purpose processor or an ASIC for video processing operations.

Image resizing is generally performed by a processor or an ASIC, so that the output image size corresponds to a desired resolution. For example, the digital camera may be set to capture an image that is 640 by 480 pixels, which may be significantly fewer pixels than the sensor is capable of generating. Another resolution commonly used in capturing video images is what is referred to as quarter VGA, which is a resolution of 320 by 240 pixels.

Moreover, a processor or ASIC that receives the digital data produced by an image sensor may reduce the image defined by the digital data to a desired resolution for more compact storage or the processor or ASIC may not perform any resizing of the digital data, prior to its storage.

SUMMARY OF THE INVENTION

Generally, the present invention pertains to an integrated image sensor for acquiring and processing electrical signals representative of an object comprising a photosite array configured to convert light into the electrical signals, an A/D converter configured to convert the electrical signals into digital data, and logic integral with the image sensor configured to scale the spatial resolution of the digital image data by an integer or non-integer-scaling factor.

The present invention may further be conceptualized as a method for acquiring and processing image data. The method comprises the steps of capturing, via the image sensor, the image data representative of an image, spatial image resolution scaling, via the image sensor, the image data by a integer or non-integer value, and outputting from the integrated image sensor resized image data.

BRIEF DESCRIPTION OF THE DRAWINGS

The invention can be better understood with reference to the following drawings.

FIG. 3 is a pictorial diagram illustrating an exemplary collection and binning of electrical signals of 2000×1500 photosite elements of an exemplary sensor of the digital camera depicted FIG. 1.

FIG. 4 is a pictorial diagram illustrating an exemplary collection and binning of electrical signals of 1920×1440 photosite elements of an exemplary sensor of the digital camera depicted FIG. 1.

FIG. 5 is a pictorial diagram illustrating an exemplary collection and binning of electrical signals of 1840×1380 photosite elements of an exemplary sensor of the digital camera depicted FIG. 1.

FIG. 6 is a pictorial diagram illustrating an exemplary collection and binning of electrical signals of 1760×1320 photosite elements of an exemplary sensor of the digital camera depicted FIG. 1.

DETAILED DESCRIPTION

The present invention generally pertains to a system and method of image data acquisition and processing. More specifically, a system in accordance with an exemplary embodiment of the present invention processes data collected from a photosite array and performs resizing, by an integer or non-integer scale factor, of the image data on an image sensor prior to its transmission to a processor or ASIC resident on an image processing device, such as a digital camera, for example.

Figure 1:
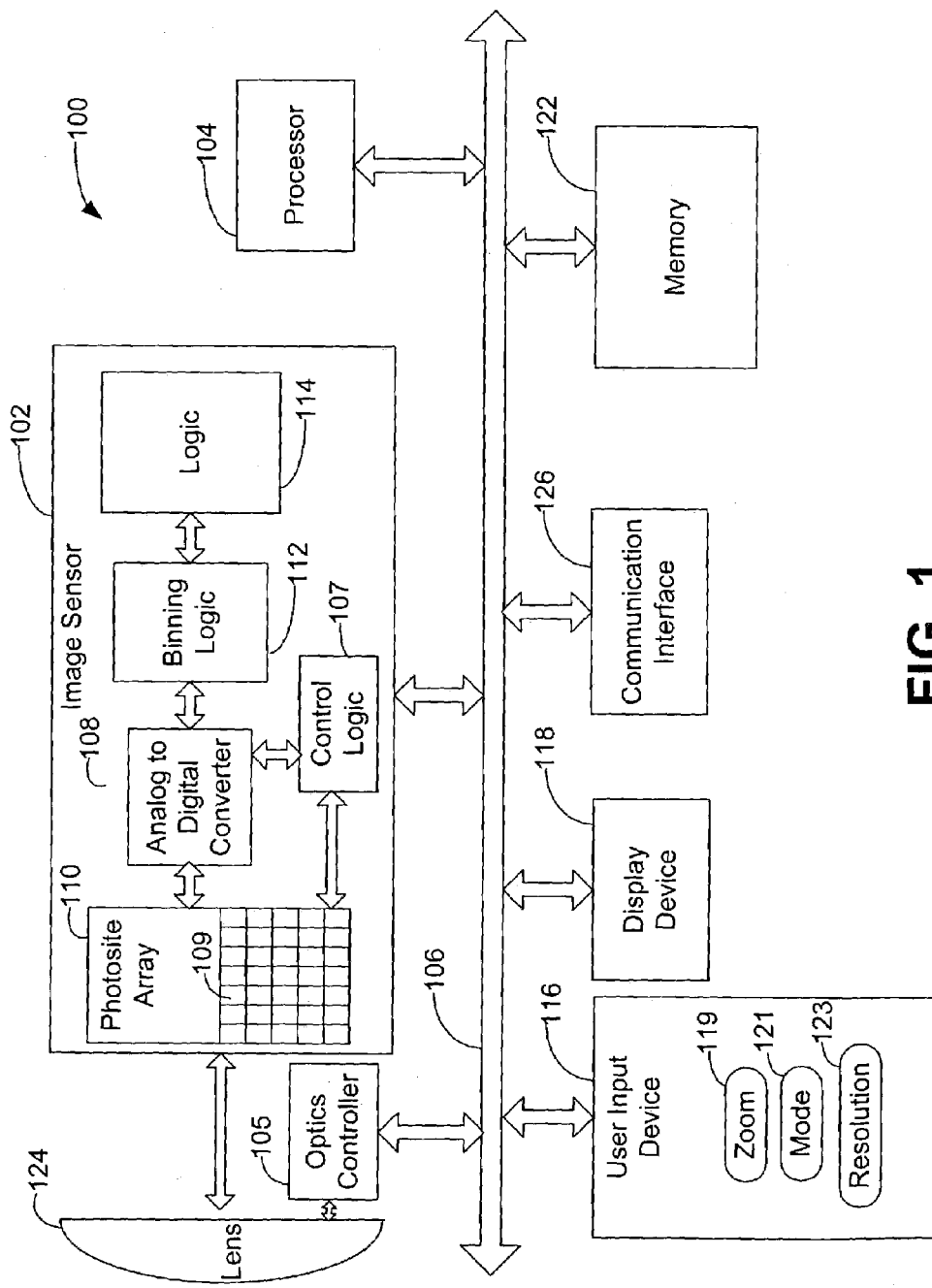
FIG. 1 is a block diagram illustrating an exemplary embodiment of a digital camera in accordance with the present invention.

FIG. 1 is a block diagram illustrating a digital camera 100 that comprises an image sensor 102 in accordance with an exemplary embodiment of the invention. The camera 100 preferably comprises an image sensor 102, a processor 104, a user input device 116, a display device 118, and an optical lens 124. The digital camera 100 may further include a memory 122 and a communication interface 126.

As shown by FIG. 1, the image sensor 102 comprises a photosite array 110, control logic 107, an A/D converter 108, and logic 114, which is integrated within the image sensor 102. In addition, the image sensor 102 may also include binning logic 112. The image sensor 102 may be a CCD, CMOS image sensor, or other type of image sensor capable of receiving light and converting the received light into image data, which may then be transmitted to the logic 114 (hereinafter referred to as integrated logic 114). The photosite array 110 includes an array of elements 109 that convert detected light into electrons. For example, the elements 109 of the photosite array 110 may be photovoltaic cells made of semiconductor materials, also referred to in the art as photodiodes.

The A/D converter 108 is may be resident on the image sensor 102. However, this residency characteristic of the A/D converter 108 illustrated in FIG. 1 is not pivotal to the embodiment of the invention as described. The A/D converter 108 may alternatively be a standalone integrated circuit separate and apart from the image sensor 102, which may be located within the camera 100.

As illustrated by way of example, the integrated logic 114, along with its associated methodology, may be implemented in hardware on an image sensor 102 such as a CMOS image sensor. Note that the integrated logic 114, may also be implemented in software or a combination of hardware and software.

When implemented in software, the integrated logic 114 can be stored and transported on any computer-readable medium for use by or in connection with an instruction execution system, such as a computer-based system, processor-containing system, or other system that can fetch and execute the instructions. In the context of this document, a "computer-readable medium" can be any means that can contain, store, communicate, propagate, or transport a program for use by or in connection with the instruction execution system. The computer-readable medium can be, for example but not limited to, an electronic, magnetic, optical, electromagnetic, infrared, or semi-conductor system or propagation medium. Note that the computer readable medium could even be paper or another suitable medium upon which the program is printed, as the program can be electronically captured, via for instance optical scanning of a paper or other medium, then compiled, interpreted, or otherwise processed in a suitable manner if necessary, and then stored in memory. As an example, the integrated logic 114 may be magnetically stored and transported on a conventional portable computer diskette or write-able CD-ROM.

The exemplary embodiment of the digital camera 100 depicted by FIG. 1 further comprises at least one processor 104, such as a digital signal processor (DSP) or a central processing unit (CPU), for example that communicates with and drives the other elements in the digital camera 100 via a local interface 106, which can include one or more buses.

An embodiment of the camera 100 of FIG. 1 receives incident light through lens 124 from an object (not shown), which is in the field of view of the lens 124. The lens 124 is preferably configured to focus the reflected light onto the sensor 102. In this regard, the light focused by the lens 124 upon the sensor 102 energizes the individual photosite elements 109 comprising the photosite array 110.

The control logic 107 of the image sensor 102 may then collect signals comprising image data from the photosite array 110 resulting from outputs related to the energized photosite elements 109. Note that the quantity of image data that can be collected from the photosite array 110 is related to the number of photosites elements 109 contained within the photosite array 110. For example, a three-megapixel sensor contains at least three million photosite elements 109 within the photosite array 110. Hence, a three-megapixel sensor outputs approximately three-million electrical signals that represent the object from which the reflected light was detected.

The manner in which the electrical signals are collected from the individual photosite elements 109 of photosite array 110 by control logic 107 depends upon the type of image sensor 102 implemented in the camera 100. For example, if a CCD is employed, the charge at each photosite may be collected at one corner of the photosite array 110. A CMOS image sensor, however, uses transistors at each photosite element 109 to amplify the electrical charge, then the charge is transmitted via conventional metal conductors.

The control logic 107 may be configured to collect data indicative of the electrical charge output from each of the outputs of the photosite elements 109 comprising the entire photosite array 110. The data indicative of the electrical signals is hereinafter referred to as "image data." However, the control logic 107 may also be configured to vary the number of outputs collected when acquiring the image data. For example, the digital camera may be configured to allow a user to zoom-in on an object within the field of view of the camera. As discussed herein, the camera may perform a digital zoom by collecting a smaller number of photosite element values, then performing spatial image resolution scaling in order to achieve image data having a desired resolution, for example 640×480. Therefore, the sensor's control logic may be configured to receive from the processor 104 of the camera 100 a signal indicative of a value that represents the digital zoom factor to used to resize an image.

After the lens 124 receives the light, the photosite array 110 converts the light to electrical signals, and the control logic 107 collects the image data, an A/D converter 108 may be employed to converts the image data collected by the control logic 107 into digital image data.

The binning logic 112 of the image sensor 102 may then perform pixel binning on the digital image data output from the A/D converter 108. Note that FIG. 1 illustrates a camera 100, which sequentially detects light using photosite elements 109 of the photosite array 110, digitizes the output employing A/D converter 108, and then bins the data with binning logic 112. One of ordinary skill in the art will recognize that it is not necessary to convert the analog data into digital form prior to pixel binning. However, in the course of describing the embodiment of FIG. 1, it will be assumed, for illustrative purposes, that the A/D conversion takes place prior to binning by binning logic 112.

If the photosite array 110 is comprised of x number of photosites 109, where "x" represents a positive integer, then the binning logic 112 receives from the A/D converter 108 digital image data comprising x number of pixel values that represent the object. The binning logic 112 may be configured to then reduce the amount of digital image data for more efficient processing by applying an appropriate binning matrix to the pixel values received. For example, in the case of three million pixel values, the binning logic 112 can perform an integer scaling, which results in an output pixel matrix of 667×500. In this regard, a 3×3 binning matrix converts nine pixel values into a single "super pixel" value representing the nine pixel values to which the 3×3 weighted matrix is applied. Note that the binning logic 112 functions to reduce the amount of pixel data for processing and transmission to the camera processor 104 using an integer resizing.

Note that employing binning logic 112 to obtain image data that is spatially scaled by a non-integer value represents one embodiment of the present invention. Other devices or methods for providing data to the integrated logic 114 may be implemented in other embodiments of the present invention. As an example, binning logic 112 may be eliminated from another embodiment, and the integrated logic 114 may perform spatial image resolution scaling on the image data received directly from the A/D converter 108. Such an embodiment is described in further detail with reference to Table 2.

The digital image data, which now may be comprised of a reduced number of values in relation to the number collected by control logic 107 from photosite array 110, is transmitted to integrated logic 114. Integrated logic 114 is configured to then perform non-integer scaling on the digital image data in order to output, to the processor 104, a resized image in accordance with a specified resolution.

Resolution may be application specific, or a user of the camera 100 may select via the user-input device 116 a desired resolution. For example, a user may select VGA resolution, which is a resolution of 640×480, and which might be employed when obtaining video or movie images. Further, the user-input device 116 may be configured to provide a user with various other options, such as, for example, quarter VGA, which is 320×240, or super VGA, which is a resolution of 800×600.

The process employed by the integrated logic 114 in the spatial resolution scaling of the binned digital image data received from binning logic 112 is now discussed with reference to FIG. 2 through FIG. 6 and Table 1 below.

TABLE 1

Representation of Sensor Data

| Charges Collected in Width | Charges Collected in Height | Width of Image Data After Binning | Height of Image Data After Binning | Scaling Factor | Digital Zoom Factor | Binning Mode |
|---|---|---|---|---|---|---|
| 2000 | 1500 | 667 | 500 | .96 | 1.0000 | 3 × 3 |
| 1920 | 1440 | 640 | 480 | 1.000 | 1.0417 | 3 × 3 |
| 1840 | 1380 | 920 | 690 | .6957 | 1.0870 | 2 × 2 |
| 1760 | 1320 | 880 | 660 | .7273 | 1.1364 | 2 × 2 |
| 1680 | 1260 | 840 | 630 | .7619 | 1.1905 | 2 × 2 |
| 1600 | 1200 | 800 | 600 | .8000 | 1.2500 | 2 × 2 |
| 1520 | 1140 | 760 | 570 | .8421 | 1.3158 | 2 × 2 |
| 1440 | 1080 | 720 | 540 | .8889 | 1.3889 | 2 × 2 |
| 1360 | 1020 | 680 | 510 | .9412 | 1.4706 | 2 × 2 |
| 1280 | 960 | 640 | 480 | 1.000 | 1.5625 | 2 × 2 |
| 1200 | 900 | 1200 | 900 | .5333 | 1.6667 | 1 × 1 |
| 1120 | 840 | 1120 | 840 | .5714 | 1.7857 | 1 × 1 |
| 1040 | 780 | 1040 | 780 | .6154 | 1.9231 | 1 × 1 |
| 960 | 720 | 960 | 720 | .6667 | 2.0833 | 1 × 1 |
| 880 | 660 | 880 | 660 | .7273 | 2.2727 | 1 × 1 |
| 800 | 600 | 800 | 600 | .8000 | 2.5000 | 1 × 1 |
| 720 | 540 | 720 | 540 | .8889 | 2.7778 | 1 × 1 |
| 640 | 480 | 640 | 480 | 1.000 | 3.1250 | 1 × 1 |
| 560 | 420 | 560 | 420 | 1.1429 | 3.5714 | 1 × 1 |
| 480 | 360 | 480 | 360 | 1.3333 | 4.1667 | 1 × 1 |
| 400 | 300 | 400 | 300 | 1.6000 | 5.0000 | 1 × 1 |
| 320 | 240 | 320 | 240 | 2.0000 | 6.2500 | 1 × 1 |
| 280 | 210 | 280 | 210 | 2.2857 | 7.1429 | 1 × 1 |
| 240 | 180 | 240 | 180 | 2.6667 | 8.3333 | 1 × 1 |
| 200 | 150 | 200 | 150 | 3.2 | 10.0000 | 1 × 1 |
| 160 | 120 | 160 | 120 | 4.0000 | 12.5000 | 1 × 1 |
| 120 | 90 | 120 | 90 | 5.3333 | 16.6667 | 1 × 1 |

TABLE 1-continued

Representation of Sensor Data

| Charges Collected in Width | Charges Collected in Height | Width of Image Data After Binning | Height of Image Data After Binning | Scaling Factor | Digital Zoom Factor | Binning Mode |
|---|---|---|---|---|---|---|
| 80 | 60 | 80 | 60 | 8.0000 | 25.0000 | 1 × 1 |
| 40 | 30 | 40 | 30 | 16.0000 | 50.0000 | 1 × 1 |

Table 1 is tabulated data illustrating an exemplary data collection and data processing of image data by a camera 100 of the present invention when the camera 100 is performing a zoom. For example, a user of camera 100 may elect to activate zoom on an image (not shown) by selecting zoom input 119 of the user-input device 116. The camera 100 may be configured to perform optical zoom, digital zoom, or both. In this regard, the processor 104 may be configured to transmit a signal over local bus 106 to the control logic 107 on image sensor 102 that is indicative of a desired digital zoom factor, which is determined by the processor 104 from the zoom user-input 119. Alternatively, the processor 104 may transmit a signal to the optics controller 105, which increases or decreases the focal length of the optics, in order to magnify an image within the field of view of the lens 124. Note that for an optical zoom, the light received by lens 124 as the optics controller 105 increases the focal length of the lens 124 is spread out across the entire photosite array 110, and all of the pixels in the array 110 are used in collecting image data.

However, when performing a digital zoom, the control logic 107 may collect image data from less that all the photosite elements 109 of the photosite array 110. The number of photosite elements 109 from which the logic 107 collects image data is related to the digital zoom factor, which the control logic 107 may receive from the processor 104 when a user initiates a zoom. The camera 100 may then manipulate the image data collected by the control logic 107 from the photosite elements 109 of the photosite array 110 to increase the resolution of the image data to a base array size, for example a base array size of 2000×1500. Thus, as a user performs a zoom on an object within the field of view of the lens 124, the processor 104 may calculate a digital zoom factor related to the user input and transmit a signal indicative of the digital zoom factor to the image sensor 102. The control logic 107 may then use the digital zoom factor to calculate the number of photosite elements 109 from which to obtain image data.

Note that Table 1 illustrates data for an image sensor 102, which comprises 2000×1500 photosite elements 109 in its photosite array 110. As the processor 104 indicates a change in the digital zoom factor, the control logic 107 collects the number of photosite elements 109 corresponding to the digital zoom factor, which is illustrated by the decreasing sensor width and sensor height used as the digital zoom factor increases. Note further that the exemplary data in Table 1 is indicative of data collected for a 50× zoom digital camera 100, as indicated in the last row of the "Digital Zoom Factor" column.

As illustrated in Table 1, as the digital camera 100 performs a digital zoom, it collects a smaller portion of the photosite array 110 and then resizes the data to obtain an image with the same base array size. For brevity sake, the example discussed herein will discuss only digital zoom functionality.

If no zoom has been initiated by the user or otherwise, the control logic 107 collects data from each photosite element 109 within the photosite array 110. In the example provided in Table 1, 2000 image data values indicative of the width of the image, as indicated in row one of the "Charges Collected in Width" column, and 1500 image data values indicative of the height of the image, as indicated in row one of the "Charges Collected in Height" column, are collected by control logic 107. The binning logic 112 then performs binning on the pixel data collected using a 3×3 matrix, as indicated in row one of the "Binning Mode" column. Therefore, the binning logic 112 calculates a binned image comprising 667×500 pixel data, as indicated in the "Width of Image Data After Binning" column and the "Height of Image Data After Binning" column, respectively.

When a user initiates a digital zoom, the control logic 107 decreases the number of photosite elements 109 from which it collects data, which the control logic 107 determines using the digital zoom factor received from processor 104. Note that the decreasing number of photosites used is illustrated by reading in descending fashion down the "Charges Collected in Width" column and the "Charges Collected in Height" column. In this regard, the control logic 107 receives from the processor 104 a digital zoom factor, $Z_f$. The control logic 107 then determines the number of photosite elements 109 from which to collect data from the width of the photosite array 110 by calculating the number of elements using the following formula:

$$E_w = T_w/D_f,$$

where $E_w$ is the total number of elements in width from which to collect data, $D_f$ is the digital zoom factor received from processor 104, and $T_w$ is the total number of photosites 109 of the photosite array 110.

The control logic 107 then determines the number of photosite elements 109 from which to collect data from the height of the photosite array 110 by calculating the number of elements using the following formula:

$$E_h = T_h/D_f,$$

where $E_w$ is the total number of elements in width from which to collect data, $D_f$ is the digital zoom factor received from processor 104, and $T_w$ is the total number of photosites 109 of the photosite array 110.

Therefore, for example, with reference to row two of Table 1, if a user initiates a zoom having a digital zoom factor of 1.0417, then the processor 104 transmits a signal to the control logic 107 indicating a the digital zoom factor of 1.0417. The control logic 107 then calculates the number of photosite elements 109 from which to collect charges from the photosite array width, $$Ew=2000/1.0417=1920 \text{ photosite elements.}$$

In addition, the control logic 107 calculates the number of photosite elements 109 from which to collect charges from the photosite array height, $$Eh=1500/1.0317=1440 \text{ photosite elements.}$$

Once the control logic 107 collects the image data indicative of the charges at the photosite elements 109, then the A/D converter converts the image data to digital image. Then the binning logic 112 may perform an integer resizing on the digital image data in order to obtain a smaller quantity of data for processing by logic 114. If binning is performed by binning logic 112, then binning logic 112 applies a binning matrix to the digitized data. The binning matrix applied to the digitized data is that matrix size that will reduce the amount of digitized data to an approximate specified resolution. For example, if a resolution of 640×480 is specified, then the binning logic 112 applies a 3×3 matrix to the digitized data, which in the example provide is 1920×1440. Therefore, the binning logic 112 calculates an image with a resolution of 640×480.

After the binning logic 112 performs an integer resizing, the integrated logic 114 then performs a non-integer resizing, so that an image transmitted to the processor 104 has the desired resolution. Table 1 represents data illustrating a desired resolution of 640×480, which is a common video resolution.

Note that the "Digital Scaling Factor" column indicates exemplary digital zoom factors that may be used in an exemplary embodiment of a sensor 102 of the present invention. However, other varying zoom factors may be employed when implementing the zoom functionality described herein.

The integrated logic 114 calculates a scaling factor which is indicative of a value that when applied to binned digital image data will convert the binned digital image data to an image with a specified resolution. For example, with reference to row three of Table 1, a signal indicating a digital zoom factor of 1.0870 is received by control logic 107 from processor 104. Accordingly, the control logic 107 collects image data from 1840 photosite elements 109 from the width of the photosite array 110 and 1380 photosite elements 109 from the height of the photosite array 110.

The binning logic 112 bins the 1840×1380 values indicative of the collected electrical signals and calculates image data having a width of 920 and a height of 690. The integrated logic 114 then calculates a scaling factor by determining a value that when applied to the binned data will result in a resolution of 640×480. Therefore, the integrated logic 114 calculates a scaling factor $$S_f = R_d/N_p,$$

where $S_f$ is the scaling factor, $R_d$ is the desired resolution, and $N_p$ is the number of pixel values in width or height. Therefore, in the example where the digital zoom factor is 1.0870, the integrated logic 114 calculates a scaling factor $$S_f = 640/920 = 0.6957, \text{ or}$$

$$S_f = 480/690 = 0.6957.$$

The integrated logic 114 then computes the resized image using the desired scaling factor coupled with an image resizing method. Note that a wide variety of image resizing techniques are well-known in the art and described in numerous publications.

As examples, the integrated logic 114 could resize the image using nearest neighbor, bilinear, or bicubic -based resizing techniques described in *Digital Image Warping*, George Wolbert (July 1990), incorporated herein by reference. In addition, the integrated logic 114 may employ efficient polyphase filtering techniques for non-integer image resizing described in *Digital Signal Processing*, J. G. Proakis and D. G. Manolakis (1996), incorporated herein by reference. Again, resizing by the integrated logic 114 is performed, so as to produce a sensor output image of the desired resolution without having to resize the sensor image on the camera's processor. In general, the integrated logic 114 resizes the image data by some integer or non-integer factor to form the image data at the 640×480 data points of the desired resolution of the image.

Figure 2:
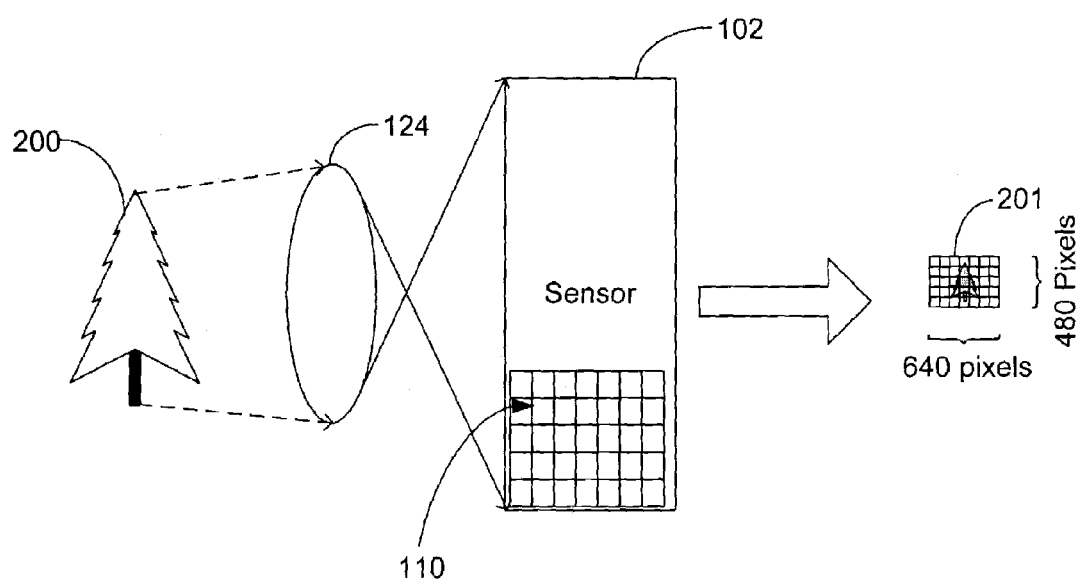
FIG. 2 is a pictorial diagram illustrating functionality of an exemplary sensor of the digital camera depicted in FIG. 1.

FIG. 2 illustrates a representation of a sensor 102 implemented with integrated logic 114 of the present invention. The lens 124 receives incident light reflected from an object, such as a tree 200, for example. The lens 124 directs the reflected light to the sensor 102, which includes a photosite array 110. The sensor 102 implemented with the integrated logic 114 transmits an image 201 having the desired resolution, which in the example of FIG. 2 is an image having a resolution of 640×480.

FIG. 3 illustrates the image capture and image processing performed by an exemplary sensor 102 of the present invention. In the present example, the photosite array 110 includes three-million photosite elements 109, which are represented by the grid squares. The photosite elements 109 receive light reflected from the tree 200 and convert the light into image data indicative of the tree 200. For simplicity, three million photosites are not shown in the photosite array 110 illustrated in FIG. 3, however, one block within the array represents approximately 1000 photosite elements 109 of the photosite array 110. When no zoom has been initiated, the control logic 107 (FIG. 1) collects data from each element 109 of the photosite array 110, which, in the example provided, includes 2000 elements in width and 1500 elements in height. The number of elements from which data is collected is illustrated by the bold block 208. The signals collected by control logic 107 from the photosite elements 109 are then transmitted to binning logic 112, which applies a 3×3 binning to the three-million values indicative of the electrical signals collected for each element 109 in the array 110. Thus, the binning logic 112 outputs image data indicative of the image 210 with a resolution of 667×500. The binning logic 112 then transmits the image data to the integrated logic 114, which interpolates the data with logic resident on the image sensor 102 using a scaling factor of 0.96 in order to obtain a 640×480 image 212. The sensor 102 then transmits the image data to the processor 104 of the camera 100.

FIG. 4 illustrates the image capture and image processing performed by an exemplary sensor 102 of the present invention when a user initiates a zoom having a digital zoom factor of 1.0417. The control logic 107 receives the digital zoom factor from the processor 104 and calculates the number of signals to be collected in width and height in accordance with the digital zoom factor received. Therefore, the control logic 107 collects electrical signals from 1920 photosite elements indict and 1440 photosite elements in height, as indicated by the bold box 208. As shown, the bold block 208 representative of the number of elements 109 from which electrical signals are collected, is now decreased in size to cover a smaller portion of the photosite array 110 of the sensor 102. Again, this pixel data is transmitted to the binning logic 112, which applies a 3×3 binning to the pixel data to obtain an output image 214 having a resolution of 640×480. In the example provided, the desired resolution is 640×480. Therefore, the integrated logic 114 applies a scaling factor of 1.0000 to the data, which has no affect upon the image. As indicated, the integrated logic 114 outputs to the processor 104 an image 214 having a resolution of 640×480.

FIG. 5 represents an image capture and image processing when the control logic 107 receives a digital zoom factor of 1.0870. The bold block 208 has now decreased to 1840× 1380. The binning logic 112 performs a 2×2 binning on the pixel data representing the image of the tree 200.

Note that it may not be desirable to bin the digitized data, which would result in an image having a resolution, which is less that the desired resolution. For example, if a 3×3 binning matrix were applied to the 1840×1380 values, then an image having a resolution of 613×460 would result. Therefore, in order for the integrated logic 114 to achieve a specified resolution, for example 640×480, the integrated logic 114 may be configured to create data that the binning logic 112 previously removed. Therefore, the size of binning matrix used by the binning logic 112 is determined by the size of the image data received for binning.

FIG. 6 illustrates an image capture and image processing using the sensor 102 of the present invention with a digital zoom factor of 1.1364. The control logic 107 collects 1760 electrical signals from 1760 elements 109 of the width of the photosite array 110 and 1320 electrical signals from 1320 elements 109 of the height of the photosite array 110, illustrated by the bold block 208. The binning logic 112 then applies a 2×2 binning to the 1760×1320 image data values to obtain an output image 222 with a resolution of 880×660. The integrated logic 114 then applies a scaling factor of 0.7273 using a selected type of interpolation, in order to output to the processor 104 a 640×480 image 224.

As noted herein, another exemplary embodiment of the present invention may be implemented without use of the binning logic 112. The process employed in such an embodiment by the integrated logic 114 in the spatial resolution scaling of the image data received from the A/D converter 108 is now discussed with reference to FIG. 7 through FIG. 10 and Table 2 below.

TABLE 2

Representation of Sensor Data Without Binning Logic

| Signals Collected in Width | Signals Collected in Height | Scaling Factor | Digital Zoom Factor |
|---|---|---|---|
| 2000 | 1500 | .32 | 1.0000 |
| 1920 | 1440 | .3334 | 1.0417 |
| 1840 | 1380 | .3478 | 1.0870 |
| 1760 | 1320 | .3636 | 1.1364 |
| 1680 | 1260 | .3840 | 1.1905 |
| 1600 | 1200 | .4000 | 1.2500 |
| 1520 | 1140 | .4212 | 1.3158 |
| 1440 | 1080 | .4444 | 1.3889 |
| 1360 | 1020 | .4706 | 1.4706 |
| 1280 | 960 | .5 | 1.5625 |
| 1200 | 900 | .5333 | 1.6667 |
| 1120 | 840 | .5714 | 1.7857 |
| 1040 | 780 | .6154 | 1.9231 |
| 960 | 720 | .6667 | 2.0833 |
| 880 | 660 | .7273 | 2.2727 |
| 800 | 600 | .8000 | 2.5000 |
| 720 | 540 | .8889 | 2.7778 |
| 640 | 480 | 1.000 | 3.1250 |
| 560 | 420 | 1.1429 | 3.5714 |
| 480 | 360 | 1.3333 | 4.1667 |
| 400 | 300 | 1.6000 | 5.0000 |
| 320 | 240 | 2.0000 | 6.2500 |
| 280 | 210 | 2.2857 | 7.1429 |
| 240 | 180 | 2.6667 | 8.3333 |
| 200 | 150 | 3.2 | 10.0000 |
| 160 | 120 | 4.0000 | 12.5000 |
| 120 | 90 | 5.3333 | 16.6667 |
| 80 | 60 | 8.0000 | 25.0000 |
| 40 | 30 | 16.0000 | 50.0000 |

Table 2 is tabulated data illustrating an exemplary data collection and data processing of image data by a camera 100 of the present invention when the camera 100 is performing a zoom on image data collected from the image sensor 102 and binning is not performed prior to the control logic 107 transmitting the data to the integrated logic 114.

As described herein with reference to Table 1, Table 2 illustrates data for an image sensor 102, which comprises 2000×1500 photosite elements 109 in its photosite array 110. As the processor 104 indicates a change in the digital zoom factor, the control logic 107 collects the number of photosite elements 109 corresponding to the digital zoom factor, which is illustrated by the decreasing sensor width and sensor height used as the digital zoom factor increases. Note further that the exemplary data in Table 2 is indicative of data collected for a 50× zoom digital camera 100, as indicated in the last row of the "Digital Zoom Factor" column.

If no zoom has been initiated by the user or otherwise, the control logic 107 collects data from each photosite element 109 within the photosite array 110. In the example provided in Table 2, 2000 image data values indicative of the width of the image, as indicated in row one of the "Signals Collected in Width" column, and 1500 image data values indicative of the height of the image, as indicated in row one of the "Signals Collected in Height" column, are collected by control logic 107.

The integrated logic 114 then calculates a scaling factor which is indicative of a value that when applied to the image data obtained from the image sensor 102 will convert the data to an image with a desired resolution. Therefore, the integrated logic calculates a scaling factor $$S_f = R_d / N_p,$$

where $S_f$ is the scaling factor, $R_d$ is the desired resolution, and $N_p$ is the number of pixel values in width or height. Therefore, with reference to row one (1) in Table 2, the control logic 107 obtains 2000×15000 pixel values from the photosite array 110. The integrated logic then calculates a scaling factor that when applied to the 2000×1500 pixel values results in a 640×480 image. Therefore, integrated logic 114 calculates $$S_f = 640/2000 = 0.32, \text{ or}$$

$$S_f = 480/1500 = 0.32.$$

The integrated logic 114 then computes the resized image using the desired scaling factor coupled with an image resizing method as described herein.

Figures 7, 8:
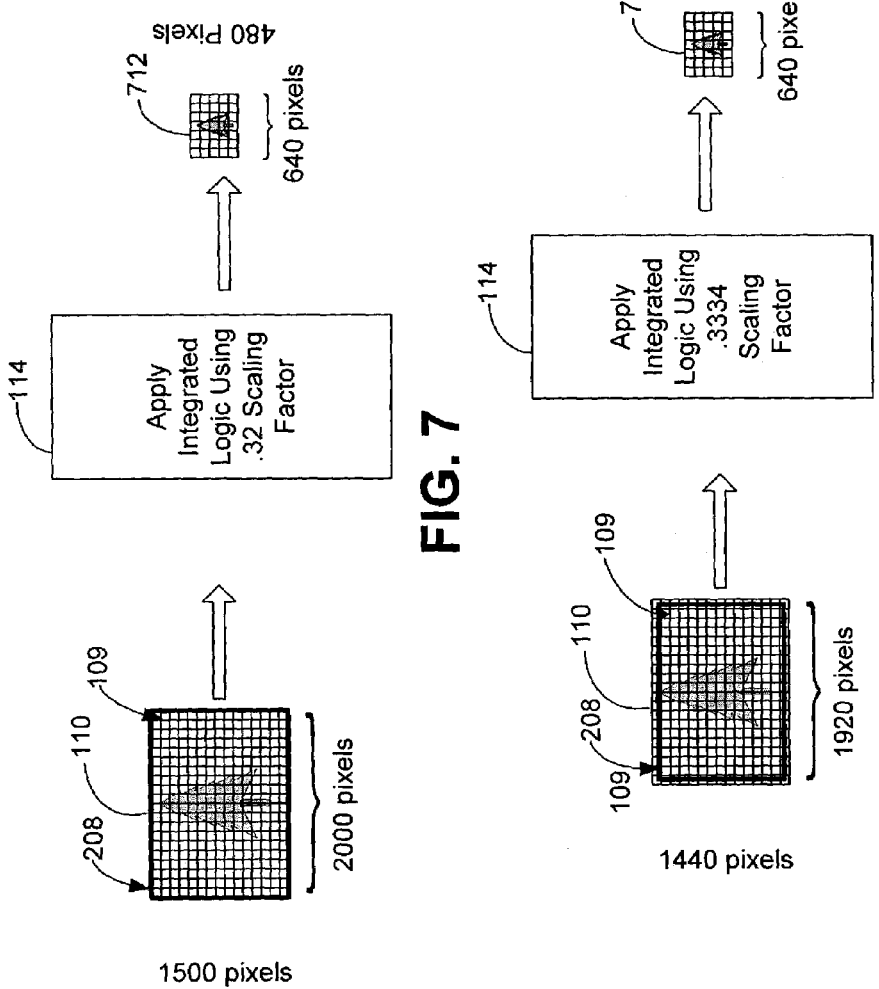
FIG. 7 is a pictorial diagram illustrating an exemplary collection of electrical signals of 2000×1500 photosite elements of an exemplary sensor of the digital camera depicted FIG. 1.
FIG. 8 is a pictorial diagram illustrating an exemplary collection of electrical signals of 1920×1440 photosite elements of an exemplary sensor of the digital camera depicted FIG. 1.

FIG. 7 illustrates the image capture and image processing performed by an exemplary sensor 102 of the present invention, which performs spatial image resolution scaling on data obtained from the image sensor 102. In the present example, the photosite array 110 includes three-million photosite elements 109, which are represented by the grid squares. The photosite elements 109 receive light reflected from the tree 200 and convert the light into image data indicative of the tree 200. For simplicity, three million photosites are not shown in the photosite array 110 illustrated in FIG. 3, however, one block within the array represents approximately 1000 photosite elements 109 of the photosite array 110. When no zoom has been initiated, the control logic 107 (FIG. 1) collects data from each element 109 of the photosite array 110, which, in the example provided, includes 2000 elements in width and 1500 elements in height. The number of elements from which data is collected is illustrated by the bold block 208. The signals collected by control logic 107 from the photosite elements 109 are then transmitted to the integrated logic 114, which interpolates the data with logic resident on the image sensor

102 using a scaling factor of 0.32 in order to obtain a 640×480 image 712. The sensor 102 then transmits the image data to the processor 104 of the camera 100.

FIG. 8 illustrates the image capture and image processing performed by an exemplary sensor 102 of the present invention when a user initiates a zoom having a digital zoom factor of 1.0417. The control logic 107 receives the digital zoom factor from the processor 104 and calculates the number of signals to be collected in width and height in accordance with the digital zoom factor received. Therefore, the control logic 107 collects electrical signals from 1920 photosite elements in width and 1440 photosite elements in height, as indicated by the bold box 208. As shown, the bold block 208 representative of the number of elements 109 from which electrical signals are collected, is now decreased in size to cover a smaller portion of the photosite array 110 of the sensor 102. Again, this pixel data is transmitted to the integrated logic 114 and the logic 114 applies a scaling factor of 0.3334 to the data to output an image 716 having a resolution of 640×480.

Figure 9:
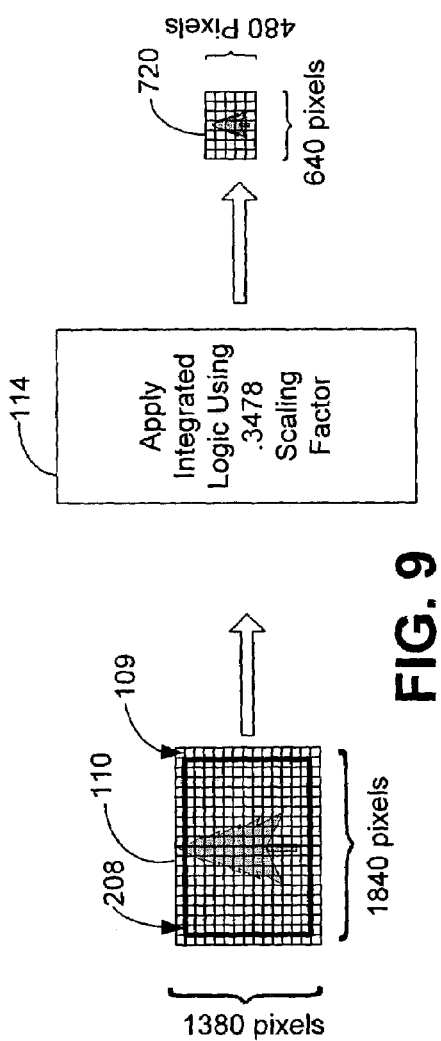
FIG. 9 is a pictorial diagram illustrating an exemplary collection of electrical signals of 1840×1380 photosite elements of an exemplary sensor of the digital camera depicted FIG. 1.

FIG. 9 represents an image capture and image processing when the control logic 107 receives a digital zoom factor of 1.0870. The bold block 208 has now decreased to 1840× 1380. The control logic 107 collects 1840 electrical signals from 1840 elements 109 of the width of the photosite array 110 and 1380 electrical signals from 1380 elements 109 of the height of the photosite array 110, illustrated by the bold block 208. The integrated logic 114 then applies a scaling factor of 0.3478 using a selected type of interpolation, in order to output to the processor 104 a 640×480 image 720.

Figure 10:
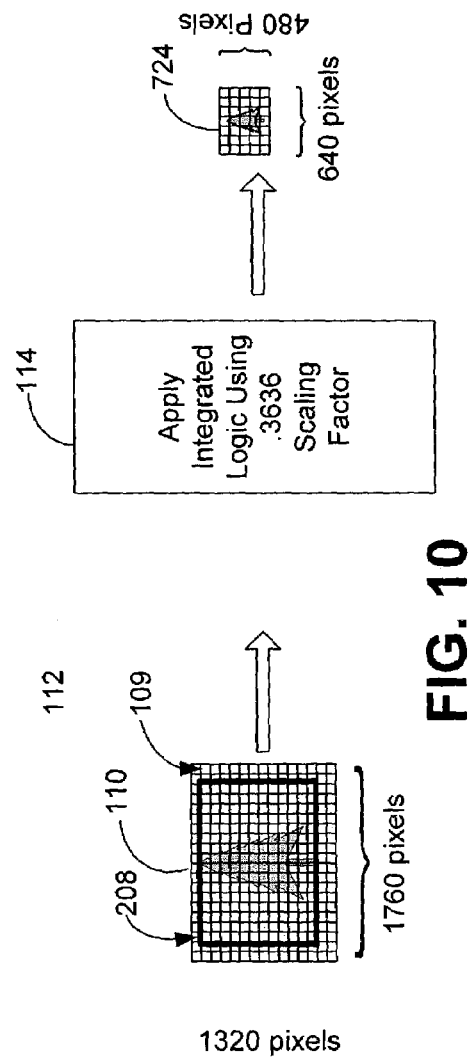
FIG. 10 is a pictorial diagram illustrating an exemplary collection of electrical signals of 1760×1320 photosite elements of an exemplary sensor of the digital camera depicted FIG. 1.

FIG. 10 illustrates an image capture and image processing using the sensor 102 of the present invention with a digital zoom factor of 1.1364. The control logic 107 collects 1760 electrical signals from 1760 elements 109 of the width of the photosite array 110 and 1320 electrical signals from 1320 elements 109 of the height of the photosite array 110, illustrated by the bold block 208. The integrated logic 114 then applies a scaling factor of 0.3636 using a selected type of interpolation, in order to output to the processor 104 a 640×480 image 724.

Figure 11:
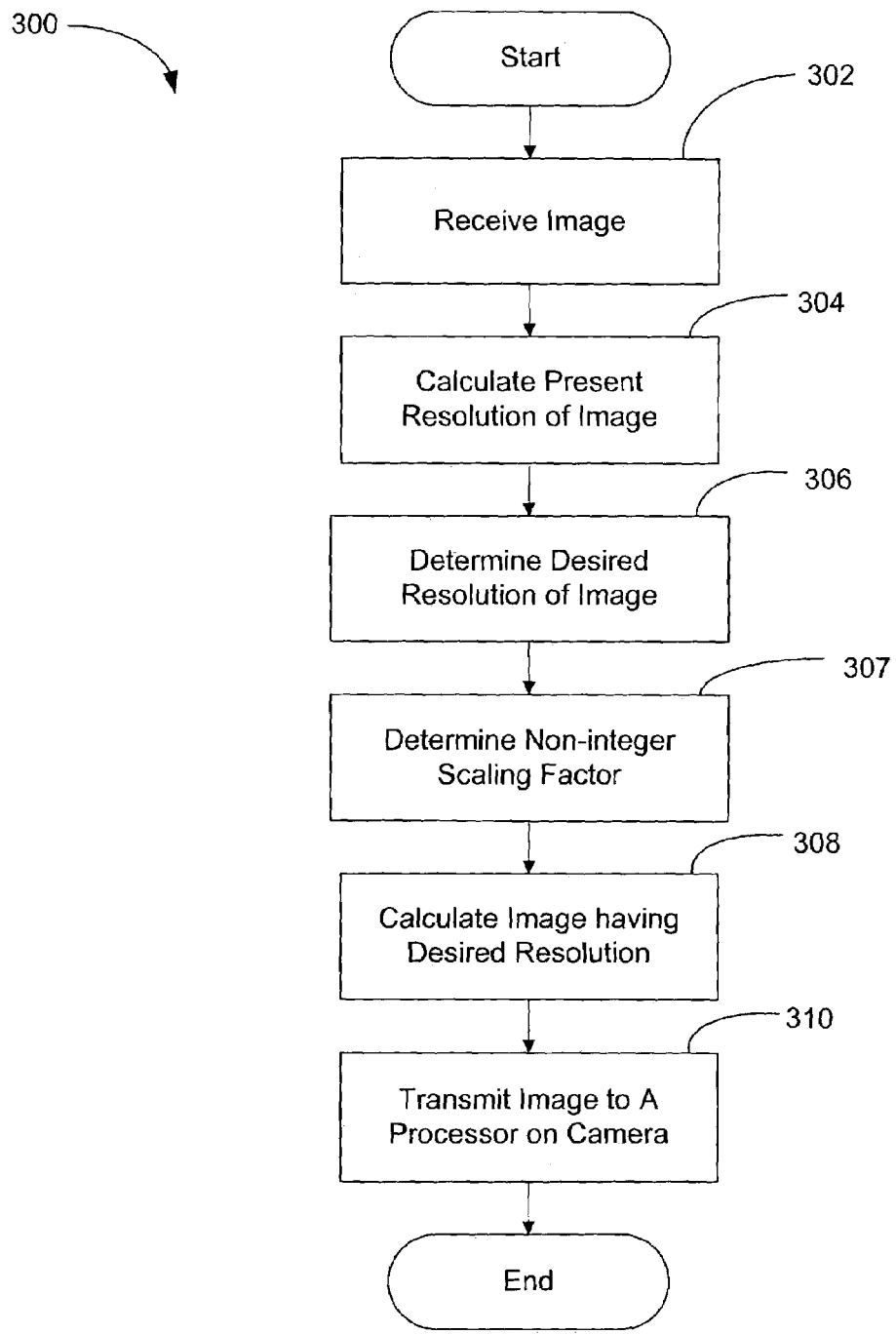
FIG. 11 is a flowchart illustrating an embodiment of an exemplary architecture and functionality of integrated logic depicted in FIG. 1.

An exemplary architecture of the operation and functionality of integrated logic 114 is now described with reference to FIG. 11. The integrated logic 114 receives digital image data, as indicated in step 302. This image data is a graphical representation of an object that reflected incident light received by lens 124. The image may be received from the A/D converter 108 or from the binning logic 112, which may first apply an integer resizing to the pixel data prior to its transmission to the integrated logic 114.

Upon receiving the aforementioned image data, the integrated logic 114 determines the current resolution of the image data received, as indicated in step 304. The resolution of the image data may be indicative of the number of photosite elements 109 from which the control logic 107 collected data. For example, if no zoom has been initiated, then the control logic 107 may collect 2000 image data values from the width of the photosite array 110 and 1500 image data values from the height of the photosite array 110. Further, the current resolution may be affected if the binning logic 112 performs a binning on the digital image data. For example, if binning is applied to the 2000×1500 image data collected by the control logic 107, then the current resolution may be 667×500.

The integrated logic 114 then determines the desired resolution of the output image that is to be transmitted to the processor 104, as indicated in step 306. This may be an automated value, for example the user may elect to enter a resolution of 640×480 via the resolution input 123. The processor 104 may then transmit a signal indicative of the user's selected resolution to the logic 114.

The integrated logic 114, in step 307, then determines the scaling factor that is to be employed to obtain the desired resolution determined in step 306. The integrated logic 114 determines the scaling factor by calculating a value that may be used to convert the resolution of the image data collected from the photosite array 110 of the sensor 102 to an image having the desired resolution. For example, if the image data collected from the photosite array 110 and binned by binning logic 112 is 667×500, then the scaling factor is determined by dividing the desired resolution 640×480 by the number of image data values collected, 667×500, which, for example, results in a scaling factor of 0.96. Note that other embodiments of the present invention may not employ binning techniques prior to determining a scaling factor. For example, the integrated logic may calcuate a scaling factor that results in a 640×480 image resolution from 2000×1500 pixel data obtained from the photosite array 110, which results in a scaling factor of 0.32.

The integrated logic 114 then applies interpolation to the collected image data, which in the example is binned data comprising 667×500 data values, to calculate an image having the desired resolution, for example a resolution of 640×480, as indicated in step 308. The interpolation applied to the data can include nearest neighbor interpolation, bilinear interpolation, bicubic interpolation, polyphase filtering techniques or any other type of image data resizing technique known in the art, as described herein.

Finally, the integrated logic 114 transmits the interpolated image data representing an image having a resolution of 640×480 to the processor 104 on camera 100, as indicated in step 310.

The processor 104 then performs other image processing operations on the data, for example data compression, prior to storing the pixel data in memory 122. The processor 104 may also display the pixel data to display device 118. A user of the camera 100 may further download the pixel data representations of objects captured by the camera 100 from memory 122 through the communication interface 126 to another device, for example a personal computer (not shown).

Now, therefore, the following is claimed:

1. An image sensor for acquiring and processing image data, the sensor comprising:
  an integrated circuit (IC) chip;
  a photosite array configured to convert light into electrical signals;
  a converter configured to convert the electrical signals into digital data; and
  scaling logic configured to apply spatial image resolution scaling to the digital image data, wherein the photosite array and the logic reside on the IC chip, and wherein the spatial image resolution scaling is defined by a scaling factor that is function of a selected image resolution, a selected zoom factor, and a total number of pixels in the photosite array.

2. The sensor of claim 1, wherein the logic is further configured to transmit scaled digital image data.

3. The sensor of claim 2, further comprising binning logic configured to receive the digital image data, the binning logic further configured to modify the resolution of the digital image data and transmit modified digital image data representative of the electrical signals, the binning logic residing on the IC chip.

4. The sensor of claim 3, wherein the scaling logic is further configured to scale the modified digital data and transmit spatially scaled data to a processor.

5. A method for acquiring and processing image data, the method comprising the steps:
   capturing, via an integrated circuit, data representative of an image;
   scaling, via the integrated circuit, the image data, wherein the scaling is performed as a function of a selected image resolution, a selected zoom factor, and a total number of pixels in a photosite array on the integrated circuit; and
   transmitting, from the integrated circuit, spatially scaled image data.

6. The method of claim 5, further comprising the step of binning the image data to modify the resolution of the data representative of the image.

7. The method as claimed in claim 6, further comprising the step of receiving an input representative of a desired resolution from a user.

8. The method as claimed in claim 7, further comprising the step of scaling the image data with a non-integer value based upon the desired resolution received in the receiving step.

9. A system for processing image data, the system comprising:
   a processor; and
   an image sensor configured to collect the image data indicative of an object, the image sensor further configured to spatial image resolution scale the image data by a scaling factor and output scaled image data to the processor, wherein the image sensor is an integrated circuit, and the scaling factor is a function of a selected image resolution, a selected zoom factor, and a total number of pixels in a photosite array on the image sensor.

10. The system of claim 9, further comprising a memory device configured to receive and store the scaled image data.

11. The system of claim 10, wherein the image sensor comprises a photosite array configured to convert light reflected from the object into electrical signals and output the electrical signals as at least one analog signal.

12. The system of claim 11, wherein the image sensor is further configured to digitize the at least one analog signal and output digital data representative of the object.

13. The system of claim 12, wherein the image sensor is further configured to bin the digital data.

14. The system of claim 9, further comprising a user-input device, the user-input device configured to receive a desired resolution from a user.

15. The system of claim 14, wherein the image sensor is further configured to receive a signal indicative of the desired resolution.

16. The system of claim 15, wherein the image sensor is further configured to calculate the scaling factor based upon the desired resolution.

17. An integrated image sensor, the sensor comprising:
   means for collecting image data representative of an object; and
   logic configured to scale the image data, wherein the means for collecting and the logic are formed on a single semiconductor, and wherein the logic is configured to scale the image as a function of a selected image resolution, a selected zoom factor, and a total number of pixels in a photosite array on the means for collecting image data.

18. A sensor of claim 17, further comprising a means for receiving a resolution value indicative of a desired resolution indicated by a user.

19. A sensor of claim 18, wherein the logic is further configured to scale the image data by an integer or non-integer value based upon the resolution value received.

20. A sensor of claim 19, further comprising a means for transmitting scaled image data to a processor.

* * * * *

UNITED STATES PATENT AND TRADEMARK OFFICE
CERTIFICATE OF CORRECTION

| | | |
|---|---|---|
| PATENT NO. | : 7,257,278 B2 | Page 1 of 1 |
| APPLICATION NO. | : 10/374276 | |
| DATED | : August 14, 2007 | |
| INVENTOR(S) | : David Burks et al. | |

It is certified that error appears in the above-identified patent and that said Letters Patent is hereby corrected as shown below:

In column 10, line 49, delete "indict" and insert -- in width --, therefor.

Signed and Sealed this

Fifth Day of May, 2009

JOHN DOLL
*Acting Director of the United States Patent and Trademark Office*